United States Patent [19]

Ferm et al.

[11] 4,193,809
[45] Mar. 18, 1980

[54] HIGH-STRENGTH CONCRETE OBJECTS

[75] Inventors: Richard L. Ferm; Robert W. Campbell, both of Lafayette, Calif.

[73] Assignee: Chevron Research Company, San Francisco, Calif.

[21] Appl. No.: 938,665

[22] Filed: Aug. 31, 1978

[51] Int. Cl.² ............................................. C04B 7/02
[52] U.S. Cl. ................................................. 106/97
[58] Field of Search ........................... 106/97; 264/333

[56] References Cited

U.S. PATENT DOCUMENTS

| | | | |
|---|---|---|---|
| 2,962,467 | 11/1960 | Wagner et al. | 106/90 |
| 3,972,969 | 8/1976 | Rie et al. | 264/333 |

*Primary Examiner*—Delbert E. Gantz
*Assistant Examiner*—Mark Bell
*Attorney, Agent, or Firm*—D. A. Newell

[57] ABSTRACT

Concrete articles of improved strength are prepared by impregnating the articles with aqueous solutions of alkali metal or alkaline earth metal polysulfides and heating them at temperatures above 110° C.

7 Claims, No Drawings

HIGH-STRENGTH CONCRETE OBJECTS

BACKGROUND OF THE INVENTION

1. Field of the Invention

This application relates to portland cement concrete articles of increased strength prepared by impregnating the articles with aqueous solutions of alkali metal or alkaline earth metal polysulfide and heating them.

Portland cement concrete has become the world's largest bulk building material. The concrete comprises an admixture of portland cement with sand and aggregate (gravel or crushed stone). It is generally formed by mixing portland cement, water, sand and gravel or crushed stone, and allowing the mixture to harden to form a dense structure. The character of the "paste" mixture of water and cement is generally held to determine the important engineering properties of the concrete.

Construction concrete is generally formulated to contain from about 5 to 30 weight percent cement based upon the dry weight of materials. Generally, higher cement content (in the upper range of the usual content) produces concrete of higher strength.

Recently, shortages of cement in many parts of the world make particularly attractive the prospects of supplying concrete of low cement content which has high strength.

2. Description of the Prior Art

Polymer cements and polymer-impregnated concretes are known. The former usually contain a latex such as polyvinyl chloride, polyvinyl acetate, acrylonitrite-butadiene-styrene, etc., or an acrylic in solid or liquid form.

U.S. Pat. No. 2,820,713 discloses mortar compositions containing minor amounts of methyl cellulose and alkaline earth polysulfides and/or bunte salts as adhesion improvers.

U.S. Pat. Nos. 2,962,467 and 3,198,644 disclose similar mortar compositions.

"Characteristics of Portland Cement from the Gypsum-Sulfuric Acid Process" by Fredrich Wolfe and Joachim Hille (Silikattechnik, 1967, 1812), pages 55–57, discusses the effect on certain portland cements by the addition of calcium sulfide ($Ca_2S$).

SUMMARY OF THE INVENTION

It has now been found that strength of portland cement concrete objects can be significantly improved by impregnating the porous concrete structure with an aqueous solution of an alkali metal or alkaline earth metal polysulfide, allowing the concrete article to dry and heating at temperatures above 110° C. Usually the concrete article will be heated at a temperature in the range of 110° to 180° C., preferably 115° to 160° C., for a time of at least 0.1 hour, preferably from about 0.25 hour to 24 hours, and most preferably from about 0.5 to 4 hours.

In a related application U.S. Ser. No. 938,668 filed Aug. 31, 1978, the strength of concrete containing small amounts of portland cement is strengthened by incorporation in the mix of a polysulfide.

In the present application, the concrete structure is formed by conventional means and allowed to dry sufficiently to allow incorporation of the polysulfide solution into the interstices of the structure. Of course, liquid-resistant concrete will not absorb sufficient polysulfide to affect the strength of the product. The porous concretes usually contain a high ratio of coarse aggregate to fine aggregate and sand. They thus set leaving many voids and leaving them susceptible to water absorption and make them more susceptible to the effects of weathering, freeze-thaw cycling, etc. Thus, the present process offers an inexpensive method of strengthening porous concretes. In the past, polymer-filled concretes have been known.

The polymer-impregnated concretes previously referred to are materials wherein relatively expensive organic polmers are formed in situ by the polymerization of monomers such as styrene, etc. These materials, while having excellent strength, are quite expensive, due to the monomer cost. The present invention, which employs inexpensive polysulfide solutions, allows substantial concrete strengthening and porosity reduction at low cost.

DESCRIPTION OF THE PREFERRED EMBODIMENTS

The alkali metal or alkaline earth metal polysulfide, preferably calcium polysulfide, is employed in aqueous solution. The calcium polysulfides are articles of commerce and are conventionally prepared by the reaction of sulfur with lime water. Other polysulfides such as barium polysulfide are produced in a similar manner. Their preparation is described on page 63 of "A Text-Book of Organic Chemistry", Vol. III, Part I, edited by J. Newton Friend, Charles Griffin and Co., London, 1925. For agricultural purposes, they are conventionally sold as concentrated aqueous solutions, e.g., about 30 weight percent $CaS_x$.

The aqueous solutions of the polysulfide will usually contain from about 5 to 30 weight percent by weight of the polysulfide, preferably from about 20 to 30 weight percent, in order to accomplish maximum impregnation with the polysulfide.

The impregnation of the articles is accomplished by capillary action or by pressure or vacuum methods or combinations of these methods. In the case of large articles, it may be only practical to spray the surface (usually continuously for extended periods), allowing the solution to interpenetrate the structure to the maximum extent possible. With smaller structures such as building blocks, pipe sections, etc., vacuum penetration is suitably employed. In these, the article is placed in a container with a quantity of polysulfide solution, the container is sealed and vacuum is applied, resulting in removal of the entrained air in the concrete. Relaxation of the vacuum and restoration of atmospheric pressure or application of superatmospheric pressure results in impregnation of the article with the polysulfide solution.

Any type of portland cement concrete structure or article can be employed, i.e., in addition to conventional construction concrete, portland-porzolan cement (concrete) clay cements which employ blast furnace slag as aggregate, expansive cement, etc., can be used.

Since the article used will usually be made of concrete which has already been cured before the polysulfide impregnation, wet cure is usually not required, and the article can be used immediately. It will develop further strength as the water evaporates from the polysulfide solution.

The major advantage of the present process and articles made with the process compared with the polymer-impregnated concrete and its preparation is that the polysulfides are inexpensive compared with organic polymer monomers employed with those materials. Further, the polysulfide imparts substantial strength to the concrete without heat, radiation cure or chemical catalysis necessary with the polymer.

Heating of the object may be accomplished by an suitable means. Large articles thus may be heated by the use of radiant heat, or by direct application of flame to the surface, etc. Smaller articles, such as building blocks, stepping stones, pipe sections, etc., can be conveniently heated in ovens.

The process by which the concrete articles are strengthened is not exactly understood, as cross-linking of polysulfides is not believed to occur, so some interaction with the portland cement or change in the sulfur structure is probably involved.

Strength development is complete after heating and cooling, assuming that a sufficient curing period is provided before the heating treatment.

In the case of large structures, where heating of the entire bulk is difficult or impossible, application of heat to the exterior will result in heating and consequent strengthening of the heated layer. This can be quite beneficial in many applications where stress is placed primarily on the outer parts of the structures.

EXAMPLE

The following example illustrates the invention. The example is illustrative only and is non-limiting.

Concrete building blocks were obtained from a building supply store and sawed into 2-inch (5.1cm) cubes. Six of the cubes were soaked in a 29 weight percent aqueous calcium sulfide solution for one hour. They were then removed from the solution and allowed to cure for one week at room temperature. Three of these cubes were heated for one hour in an oven at 250° F. (121° C.). They were allowed to cool overnight.

Three untreated cubes, which were soaked in polysulfide but not heated, and three which were soaked and heated were broken in a Baldwin press at a crushing rate of 0.5 in (1.27 cm) per minute. The average compressive strength (psi) for the soaked but unheated samples was 3166 and the heated samples 5000.

Although many specific embodiments of the invention have been described in detail, it should be understood that the invention is to be given the broadest possible interpretation within the terms of the following claims.

What is claimed is:

1. A process for producing a portland cement concrete object of increased strength by impregnating the object with an aqueous solution of alkali metal or an alkaline earth metal polysulfide and heating the object at a temperature between 110° C. and 180° C. for at least 0.1 hour.

2. The process of claim 1 in which the heating is carried out for a period of from about 0.25 to 24 hours.

3. The process of claim 1 in which polysulfide is calcium polysulfide.

4. The process of claim 1 wherein the impregnated article is allowed to cure by drying.

5. The process of claim 1 in which the solution contains from 15 to 30 weight percent of the polysulfide.

6. The process of claim 1 wherein the impregnation is carried out by vacuum impregnation.

7. The process of claim 1 in which the temperature is between about 115° and 150° C.